US009165336B2

(12) United States Patent
Scholz et al.

(10) Patent No.: US 9,165,336 B2
(45) Date of Patent: Oct. 20, 2015

(54) METHOD AND APPARATUS FOR CHECKING A SECURITY FEATURE OF A VALUE DOCUMENT

(71) Applicant: GIESECKE & DEVRIENT GMBH, Munich (DE)

(72) Inventors: Ingo Scholz, Bremen (DE); Jan Domke, Vaterstetten (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/365,709

(22) PCT Filed: Dec. 19, 2012

(86) PCT No.: PCT/EP2012/005272
§ 371 (c)(1),
(2) Date: Jun. 16, 2014

(87) PCT Pub. No.: WO2013/091855
PCT Pub. Date: Jun. 27, 2013

(65) Prior Publication Data
US 2014/0355818 A1 Dec. 4, 2014

(30) Foreign Application Priority Data
Dec. 21, 2011 (DE) .......................... 10 2011 121 911

(51) Int. Cl.
*G06K 9/00* (2006.01)
*G06T 1/00* (2006.01)
(Continued)

(52) U.S. Cl.
CPC ................ *G06T 1/0021* (2013.01); *G06K 9/46* (2013.01); *G06T 7/0012* (2013.01); *G07D 7/08* (2013.01); *G07D 7/12* (2013.01); *G06K 2009/4666* (2013.01)

(58) Field of Classification Search
CPC ....... G07D 7/002; G07D 7/08; G07D 7/0046; G07D 7/12
USPC .................................................. 382/135, 299
See application file for complete search history.

(56) References Cited

U.S. PATENT DOCUMENTS 5,295,196 A * 3/1994 Raterman et al. ............. 382/135
6,128,401 A * 10/2000 Suzuki et al. ................. 382/135
(Continued)

FOREIGN PATENT DOCUMENTS

DE        102 59 288 A1     7/2004
DE     10 2004 036 229 A1   2/2006
(Continued)

OTHER PUBLICATIONS

German Search Report from German Application No. 10 2011 121 911.4, Sep. 11, 2012.
(Continued)

*Primary Examiner* — John Strege
(74) *Attorney, Agent, or Firm* — Workman Nydegger

(57) ABSTRACT

A method includes checking a specified security feature of a value document which is present in a specified security-feature region of the value document. The security feature includes captured pixel data which describe spatially resolved with a specified optical spatial resolution, an optical image at least of the security-feature region of the value document, and there are captured ultrasound data which describe an ultrasonic property of the value document at least in the security-feature region, spatially resolved with a specified ultrasonic spatial resolution. The ultrasonic spatial resolution is lower than the optical spatial resolution. From the pixel data there are established first reduced-resolution pixel data for reduced-resolution pixels of the first reduced-resolution image which describe a reduced-resolution optical image at least of the security-feature region of the value document, whose optical spatial resolution corresponds to the ultrasonic spatial resolution.

17 Claims, 7 Drawing Sheets

(51) Int. Cl.
*G07D 7/08* (2006.01)
*G07D 7/12* (2006.01)
*G06K 9/46* (2006.01)
*G06T 7/00* (2006.01)

(56) References Cited

U.S. PATENT DOCUMENTS

| | | |
|---|---|---|
| 6,763,721 B2 | 7/2004 | Wunderer et al. |
| 7,517,796 B2 | 4/2009 | Raghuram et al. |
| 7,607,528 B2 | 10/2009 | Derks et al. |
| 8,510,062 B2 | 8/2013 | Domke et al. |
| 8,588,477 B2 | 11/2013 | Holl et al. |
| 2003/0183012 A1 | 10/2003 | Wunderer et al. |
| 2006/0151282 A1* | 7/2006 | Derks et al. .................. 194/207 |
| 2007/0187209 A1 | 8/2007 | Stenzel et al. |
| 2009/0245590 A1 | 10/2009 | Holl et al. |
| 2009/0312957 A1 | 12/2009 | Domke et al. |
| 2010/0060881 A1* | 3/2010 | Kayani .......................... 356/72 |
| 2010/0132470 A1* | 6/2010 | Domke et al. ................. 73/642 |

FOREIGN PATENT DOCUMENTS

| | | |
|---|---|---|
| DE | 10 2006 033 001 A1 | 1/2008 |
| DE | 102006053788 A1 | 5/2008 |
| EP | 0 582 548 A1 | 2/1994 |
| WO | 0210716 A2 | 2/2002 |
| WO | 2004055740 A2 | 7/2004 |
| WO | 2005013207 A1 | 2/2005 |

OTHER PUBLICATIONS

International Preliminary Report on Patentability for International PCT Application No. PCT/EP2012/005272, Jun. 24, 2014.
International Search Report for corresponding International PCT Application No. PCT/EP2012/005272, mailed Mar. 13, 2013.

* cited by examiner

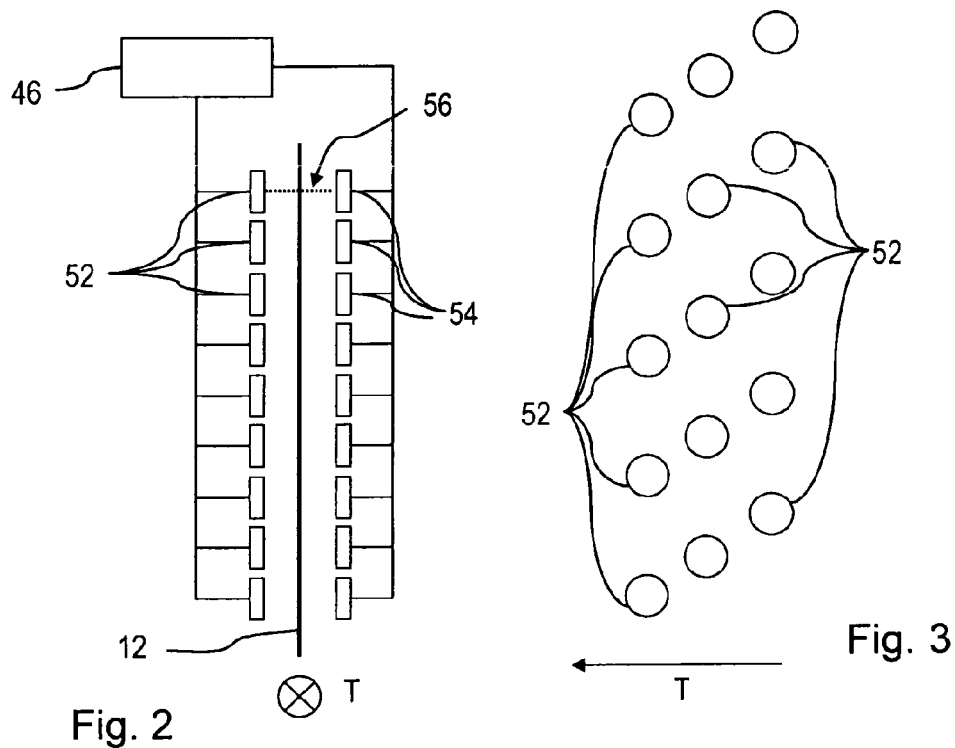
Fig. 2
Fig. 3
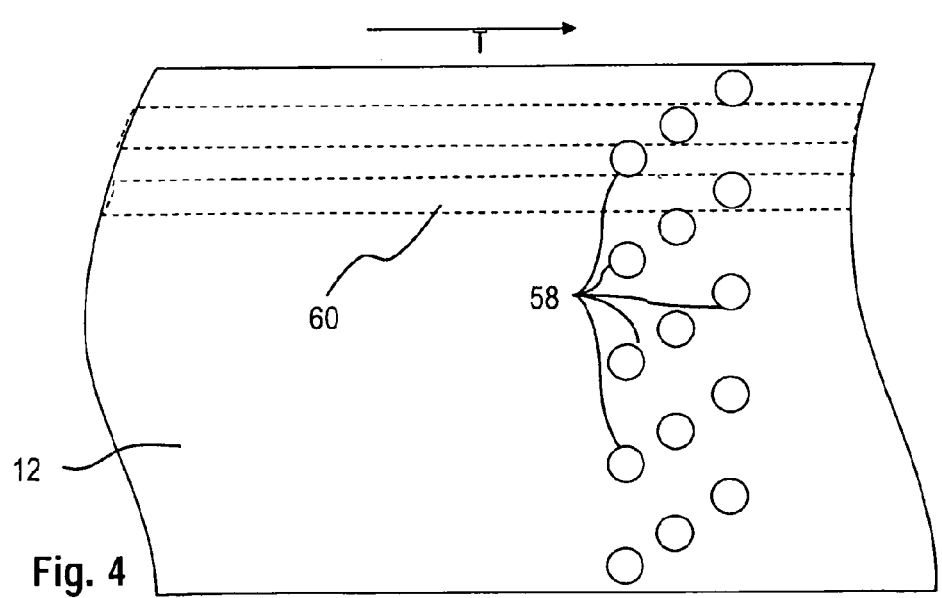
Fig. 4

58  76

METHOD AND APPARATUS FOR CHECKING A SECURITY FEATURE OF A VALUE DOCUMENT

BACKGROUND

The present invention relates to a method for checking a security feature of a value document which is present in a specified security-feature region of the value document, in particular a watermark, and to a corresponding apparatus for checking a security feature of a value document which is present in a specified security-feature region of the value document, in particular a watermark.

Value documents are understood here to be sheet-shaped objects that represent for example a monetary value or an authorization and hence should not be manufacturable arbitrarily by unauthorized persons. They hence have security features that are not easily manufactured, in particular copied, whose presence is an indication of authenticity, i.e. of manufacture by an authorized body. Important examples of such value documents are chip cards, coupons, vouchers, checks and in particular bank notes.

Such value documents normally possess a sheet-shaped substrate which can for example carry print elements or foil elements as further elements of the value document.

Such value documents, more precisely their security features, are checked for their authenticity, inter alia, by means of corresponding apparatuses for example, but the certainty of the check, i.e. the certainty with which authentic and forged value documents or security features of the value documents can be distinguished, is, depending on the security feature, not as great as appears desirable.

An example of this the recognition of watermarks, which are understood within the framework of the present invention to be security features that are formed by a specified variation of the thickness of the value-document substrate at equal density, i.e. equal weight per volume. Although such watermarks are difficult to manufacture, there are forgeries of watermarks that are more or less good.

SUMMARY

The invention is hence based on the object of stating a method for checking a security feature, preferably watermark, of a value document that allows a good check of the security feature, as well as means for carrying out the method.

This object is achieved by a method for checking a specified security feature of a value document which is present in a specified security-feature region of the value document, preferably a watermark, wherein there are captured pixel data which describe, spatially resolved with a specified optical spatial resolution, an optical image at least of the security-feature region of the value document, there are captured ultrasound data which describe an ultrasonic property of the value document at least in the security-feature region, spatially resolved with a specified ultrasonic spatial resolution, the ultrasonic spatial resolution being lower than the optical spatial resolution, from the pixel data there are established first reduced-resolution pixel data for reduced-resolution pixels of a first reduced-resolution image which describe a reduced-resolution optical image at least of the security-feature region of the value document, whose optical spatial resolution corresponds to the ultrasonic spatial resolution, so that locations respectively associated with the ultrasound data have associated therewith first reduced-resolution pixel data, and it is at least checked to what extent or whether the first reduced-resolution pixel data and the ultrasound data correspond to each other. Preferably, there is formed at least in dependence on the result of the check a comparison signal which represents whether an indication was established that the security feature is present, or an indication was established that the security feature is not present. The stated steps are carried out by means of an evaluation device.

The object is further achieved by an apparatus for checking a specified security feature of a value document which is present in a specified security-feature region of the value document, preferably a watermark, which has an evaluation device which is configured for carrying out a method according to the invention. In particular, the object is achieved by an apparatus for checking a security feature of a value document, preferably a watermark, which is present in a specified security-feature region of the value document, said apparatus having an evaluation device which is configured for capturing pixel data which describe, spatially resolved with a specified optical spatial resolution, an optical image at least of the security-feature region of the value document, capturing ultrasound data which describe an ultrasonic property of the value document at least in the security-feature region, spatially resolved with a specified ultrasonic spatial resolution, the ultrasonic spatial resolution being lower than the optical spatial resolution, establishing from the pixel data first reduced-resolution pixel data for reduced-resolution pixels of a first reduced-resolution image which describe a reduced-resolution optical image at least of the security-feature region of the value document, whose optical spatial resolution corresponds to the ultrasonic spatial resolution, so that locations respectively associated with the ultrasound data have associated therewith first reduced-resolution pixel data, at least checking to what extent the first reduced-resolution pixel data and the ultrasound data correspond to each other. Preferably, the evaluation device is further configured for forming at least in dependence on the result of the check a comparison signal which represents whether an indication was established that the security feature is present, or an indication was established that the security feature is not present.

The comparison signal can serve solely for storing a corresponding value, but can also be employed directly for classifying the checked value document.

The evaluation device can preferably have a data-processing device which can comprise a processor and a memory which stores instructions of a computer program upon whose execution by the processor the method according to the invention is carried out. The subject matter of the invention is hence also a computer program for checking a security feature of a value document which is present in a specified security-feature region of the value document, said program comprising instructions upon whose execution by a data-processing device a method according to any of the preceding claims is carried out. Further subject matter of the invention is a data carrier on which a computer program according to the invention is stored. The data carrier is a physical object, for example an optical data carrier or a flat memory or the like.

The invention relates to the check of a specified security feature of a value document, i.e. the check of whether a value document has the specified security feature. Preferably, the security feature is a security feature that is formed by a specified local variation or location dependence of the thickness and/or of the weight per unit area of the value document, on the one hand, and a corresponding specified local variation or location dependence of at least one optical property, on the other hand. The corresponding variation of the at least one optical property can be for example a corresponding variation of the transmissivity to optical radiation in a specified wavelength region. Particularly preferably, the variations are strongly correlated locally.

Particularly preferably, the security feature is a watermark. Particularly preferably, the watermark is a bar watermark which is typically characterized by a particularly pronounced thickness profile.

The employment of both spatially resolved optical and spatially resolved ultrasonic properties enables difficulties upon checking solely with an optical sensor or solely with an ultrasonic sensor to be at least reduced or even eliminated. In particular, in the method, it is unnecessary to first ascertain by means of a first sensor the presence of the security feature, which is then confirmed or improved by an examination with a second sensor. Rather, the pixel data and the ultrasound data are evaluated together, without a recognition of the security feature having to have already taken place.

The method is based on the pixel data and the ultrasound data.

At least for capturing the pixel data and the ultrasound data, the evaluation device can have at least one corresponding data interface via which the pixel data or the ultrasound data can be captured. Preferably, the apparatus further has an optical sensor which is configured for producing, for the value document, pixel data which describe an optical image, spatially resolved with a specified optical spatial resolution, at least of the security-feature region of the value document, and an ultrasonic sensor which is configured for producing, for the value document, ultrasound data which describe an ultrasonic property of the value document at least in the security-feature region, spatially resolved with a specified ultrasonic spatial resolution, the ultrasonic spatial resolution being lower than the optical spatial resolution, and the optical sensor, the ultrasonic sensor and the evaluation device are so configured that the evaluation device employs the pixel data formed for the value document as pixel data, and the ultrasound data formed for the value document as ultrasound data, when the method is being carried out. In the method, the pixel data are preferably formed by means of an optical sensor which is configured for producing, for the value document, pixel data which describe an optical image, spatially resolved with a specified optical spatial resolution, of the value document, and the ultrasound data by means of an ultrasonic sensor which is configured for producing, for the value document, ultrasound data which describe an ultrasonic property of the value document at least in the security-feature region, spatially resolved with a specified ultrasonic spatial resolution, the ultrasonic spatial resolution being lower than the optical spatial resolution. These can then be captured, preferably via the above-mentioned at least one data interface, i.e. data interface or data interfaces.

The pixel data describe an optical image at least of the security-feature region having at least the security feature, but can also be greater. The optical image is an image in one or more specified wavelength regions of the optical spectrum, i.e. of the spectrum from the ultraviolet to the infrared. The image can be a remission image, but is preferably a transmission image, particularly preferably a transmission image in the region of visible radiation. The optical sensor is preferably configured for capturing corresponding images.

Ultrasound is understood within the framework of the present invention to be sound with a frequency above 20 kHz. Preferably, there can be employed ultrasound in a specified frequency range, particularly preferably in the range between 40 kHz and 800 kHz, very particularly preferably in the range between 100 kHz and 450 kHz. The ultrasonic sensor is then preferably configured for emitting the ultrasound in the specified frequency range, which can be obtained by choosing corresponding ultrasonic transducers serving as transmitters and receivers, and corresponding actuation. For capturing the ultrasonic property, the ultrasound can be emitted onto the value document continuously or preferably in pulses, and the ultrasound emanating from the value document thereupon captured. When ultrasonic pulses are employed, the frequency is understood here to be the average, weighted with the frequency-dependent amplitudes, over the frequencies of the pulse, or the frequency at which the amplitude is maximum.

The ultrasonic property must be established in a spatially resolved manner, i.e. the ultrasonic property is established for different measuring or sensing regions of the value document, with at least some of the measuring or sensing regions possibly, but not necessarily, touching or overlapping each other. For each of the measuring regions, and thus a location on the value document that represents the respective measuring region, there can be formed a measurement value rendering the ultrasonic property, which can be processed further. The ultrasound data formed upon the measurement and captured in the method comprise the measurement values for the locations for which the measurement values were captured, and preferably respectively associated location information, which can, however, also result from the arrangement of the measurement values in a value field. For simplicity's sake, locations associated with the ultrasound data will be spoken of hereinafter; a location associated with ultrasound data for a location is the location that is determined by the location information of the ultrasound data for the location.

As an ultrasonic property there can in principle be employed any suitable property that characterizes the interaction of the value document with ultrasound. According to a preferred embodiment, there can be employed as an ultrasonic property the transmission or transmissivity to ultrasound in the specified frequency range. Then, for establishing the at least one ultrasonic property, ultrasound can be emitted onto the value document and the ultrasound transmitted by the value document captured. For this purpose, in the device, the ultrasonic sensor can be configured for emitting ultrasound onto the value document and capturing ultrasound transmitted by the value document.

The ultrasonic spatial resolution of the ultrasound data is lower than the optical spatial resolution of the pixel data. The ultrasonic spatial resolution of ultrasound data or spatial resolution of pixel data can be understood in particular to be the smallest distance between locations with which ultrasound data or pixel data are associated. The difference of these distances or spatial resolutions can lie in particular in the range of a factor of five or more.

According to the invention, there are hence formed from the pixel data reduced-resolution pixel data for reduced-resolution pixels of a reduced-resolution image whose spatial resolution corresponds to the ultrasonic spatial resolution, so that locations respectively associated with the ultrasound data have associated therewith first reduced-resolution pixel data. Preferably, the reduced-resolution pixels are so chosen that they respectively correspond in form and size to the form and size of the measuring or sensing regions for which the ultrasonic property is established. Particularly preferably, the form and size of a reduced-resolution pixel are so chosen that it encloses a sensing region as closely as possible. The size and form of the sensing regions can be established by simulations or experiments.

A preferred development provides that, in the method, different displacement vectors are specified for the optical image, for each of the displacement vectors there are established from the pixel data of the optical image reduced-resolution pixel data for a further reduced-resolution image associated with the displacement vector which describe a reduced-resolution optical image of the security-feature region of the value document whose optical spatial resolution corresponds to the ultrasonic spatial resolution, so that locations respectively associated with the ultrasound data have associated therewith for the security-feature region reduced-resolution pixel data of the further reduced-resolution image associated with the displacement vector. The pixel data of the optical image that are employed for establishing the further reduced-resolution pixel data for a respective location are pixel data for pixels that are displaced by the specified displacement vector relative to the pixels of the optical image that are employed for establishing the first reduced-resolution pixel data for the respective location. It is further checked to what extent or whether the further reduced-resolution spatially resolved pixel data for the reduced-resolution images associated with the respective displacement vectors and the spatially resolved ultrasound data correspond to each other, and the comparison signal is formed additionally in dependence on the further check. These steps can be carried out by means of the above-mentioned evaluation device. The evaluation device of the apparatus can then be configured for carrying out the steps stated in this paragraph. In this development, there are thus altogether produced a plurality of reduced-resolution images which have the same spatial resolution but differ in which pixel data the reduced-resolution pixel data are formed from. A displacement vector is understood here to be the statement of two lengths in two specified, non-parallel directions in the plane of the image, or the statement of an angle between the vector and a specified axis and a length, the length of the vector. When the locations lie on a grid, the directions preferably lie on corresponding directions of the grid axes.

Preferably, the comparison signal is formed by establishing at which of the checks, i.e. for which of the first reduced-resolution image and the reduced-resolution images associated with the displacement vectors, the reduced-resolution pixel data corresponded to the ultrasound data best, and forming the comparison signal in dependence on the result of this check. For this purpose, the evaluation device can be configured accordingly.

The different displacement vectors can basically be chosen arbitrarily. Particularly preferably, in the method, the displacement vectors lie on a grid formed by the pixels of the optical image. In the apparatus, the evaluation device is configured accordingly. The length of the displacement vectors is preferably not greater here than twice the spatial resolution of the ultrasound data. Preferably, the number of the different displacement vectors is no greater than the square of the ratio of the spatial resolution of the ultrasound data and the spatial resolution of the pixel data. Further, the displacement vectors preferably comprise pairs of displacement vectors which respectively have opposite directions.

The check of to what extent or whether the ultrasound data and the pixel data for one of the reduced-resolution images, i.e. the first reduced-resolution image and, if present, the at least one further reduced-resolution image, correspond to each other for the security-feature region can be effected in different ways. Preferably, in the method, for checking to what extent or whether the reduced-resolution pixel data and the ultrasound data correspond to each other, there is established a value of a, preferably normalized, cross-correlation between the reduced-resolution pixel data and the ultrasound data, and particularly preferably upon the forming of the comparison signal there is established the greatest cross-correlation, i.e. the greatest value of the cross-correlations, the established greatest cross-correlation is compared with a specified threshold value. In dependence on the comparison with the threshold value, the comparison signal can then be formed. In the apparatus, the evaluation device is configured accordingly for this purpose. When only one, or the first, reduced-resolution image is employed, the greatest cross-correlation, i.e. the greatest value of the cross-correlation, is the only established cross-correlation. Otherwise, there are established for the reduced-resolution pixel data for the first reduced-resolution image and the reduced-resolution pixel data associated with the displacement vectors respectively the cross-correlations, i.e. the values of the cross-correlation, the greatest one of these cross-correlations is sought and employed in the comparison with the threshold value. The threshold value can be established by examining reference value documents of the same type, preferably also known forgeries of such reference value documents. This procedure offers the advantage of being simple and fast to perform.

The reduced-resolution image, i.e. the first or at least one further reduced-resolution image, can be established in an arbitrary suitable way.

In so doing, the pixel data of the optical image can be employed unchanged. However, in the method, there can preferably be performed before the establishment of the reduced-resolution pixel data a smoothing of the pixel data of the optical image, at least in the security-feature region. In the apparatus, the evaluation device can then be configured accordingly. This measure offers the advantage that if the method employed for smoothing the pixel data is suitably designed, for example as a low-pass filtering, noise in the pixel data of the optical image can be at least partly suppressed.

In the simplest case, there can be set as pixel data of the reduced-resolution image from the pixel data of the optical image for a location of the ultrasound data the pixel data to which the location of the ultrasound data is nearest or to which the location of the ultrasound data is nearest upon a displacement by the displacement vector with which the reduced-resolution image is associated.

According to a preferred embodiment, in the method, however, for establishing the reduced-resolution pixel data for a reduced-resolution pixel or further reduced-resolution pixel there are employed pixel data of pixels of the optical image that form a pixel block whose greatest diameter is greater than three times the spatial resolution of the optical image and smaller than 1.2 times the spatial resolution of the ultrasonic sensor. In the apparatus, the evaluation device can then be configured accordingly. The greatest diameter of the pixel block is understood here to be the greatest distance between two edge pixels of the pixel block. A pixel block is understood to be a set of pixels at least respectively two of which are directly neighboring. Preferably, the locations to which the pixels of the pixel block correspond form a domain with a form corresponding to the arrangement of the pixels in the optical image, particularly preferably a rectangular or square grid, or the arrangement of the locations of the ultrasound data of the ultrasonic image that are directly neighboring to a location of the ultrasound data of the ultrasonic image, for example a rectangular or square grid or a hexagonal grid.

According to another preferred embodiment, in the method, for establishing the reduced-resolution pixel data for a reduced-resolution pixel or further reduced-resolution pixel there are employed pixel data of pixels of the optical image that form a pixel block whose greatest diameter corresponds to the spatial resolution of the ultrasonic sensor. In the apparatus, the evaluation device can then be configured accordingly. Particularly preferably, the location, or the location displaced by the displacement vector, lies in the center of the pixel block. With respect to the form of the pixel blocks, the remarks in the preceding paragraph apply.

According to an embodiment, in the method, when establishing the reduced-resolution pixel data there can be formed a simple or weighted arithmetic average of pixel data of the optical image. In particular, there can thus be formed for a location of the reduced-resolution image the simple or weighted arithmetic average over the pixel data of the pixels of the pixel block stated in the two preceding paragraphs. Establishing the reduced-resolution pixel data can then be done especially fast.

The number of the displacement vectors is in principle arbitrary. The check tends to improve at an increasing number of displacement vectors. When employing pixel blocks, in the method, the number of the displacement vectors can preferably be greater than one sixteenth of the number of the pixels of the pixel block, preferably greater than one ninth of the number of the pixels of the pixel block, but at least four. In the apparatus, the evaluation device can then be configured accordingly.

BRIEF DESCRIPTION OF THE DRAWINGS

The invention will hereinafter be explained further by way of example with reference to the drawings. There are shown:

FIG. 2 a schematic representation of an ultrasonic sensor of the bank-note processing apparatus in FIG. 1 having a control and evaluation device in a view along a transport direction of bank notes, FIG. 3 a schematic representation of ultrasonic transmitters of the ultrasonic sensor in FIG. 2 in a plane parallel to the plane of a bank note to be examined, FIG. 4 a schematic partial representation of a bank note having spots or sensing regions acoustically irradiated by the ultrasonic transmitters of the ultrasonic sensor in FIG. 2, FIG. 5 a schematic representation of a bank note having locations or sensing regions for which transmission values were established by means of the ultrasonic sensor in FIG. 3, as well as corresponding reduced-resolution pixels, FIG. 6 a schematic representation of an optical transmission sensor of the bank-note processing apparatus in FIG. 1, FIG. 7 a schematic representation of the pixels of a transmission image of the bank notes in FIG. 5 which was captured with the optical transmission sensor in FIG. 6, FIG. 8 a schematic representation of an authentic bank note having a bar watermark, FIG. 9 a simplified flowchart for an example of a method for checking a specified security feature of a value document in the form of a watermark which is present in a specified security-feature region of the value document, and FIGS. 10a to c comparisons, corresponding to FIGS. 5 and 7, of ultrasound data and reduced-resolution pixels for the bank note in FIG. 8, on the one hand, and the pixels in the captured optical transmission image that were employed for establishing the reduced-resolution pixels, on the other hand, without displacement (a) and for two different displacement vectors (b and c).

DETAILED DESCRIPTION OF VARIOUS EMBODIMENTS

Figure 1:
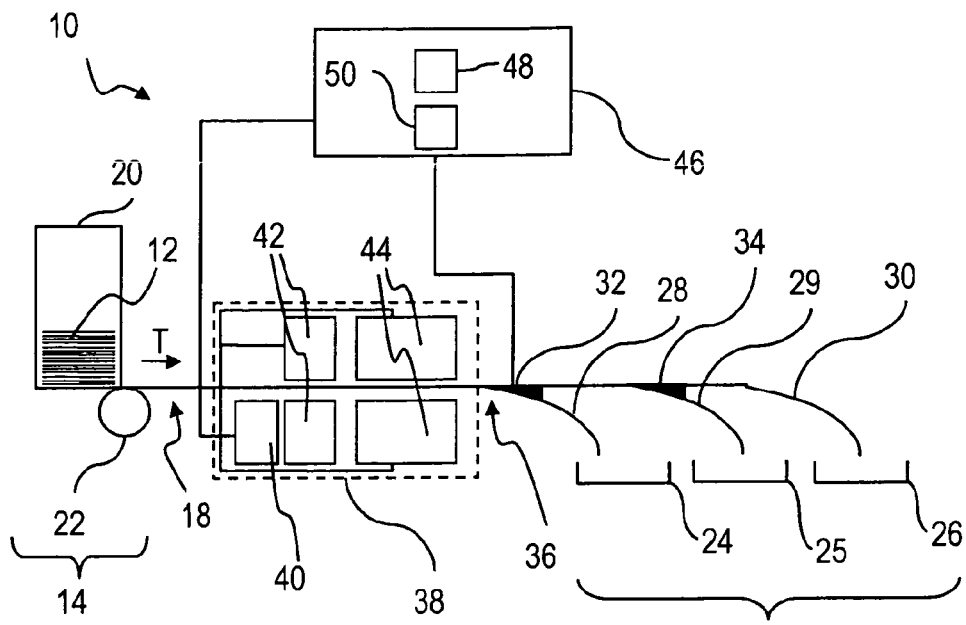
FIG. 1 a schematic representation of a bank-note processing apparatus.

A value-document processing apparatus 10 in FIG. 1, in the example an apparatus for processing value documents 12 in the form of bank notes, is configured for sorting value documents in dependence on the recognition of the authenticity of processed value documents.

It has a feeding device 14 for feeding value documents, an output device 16 for receiving processed, i.e. sorted, value documents, and a transport device 18 for transporting singled value documents from the feeding device 14 to the output device 16.

The feeding device 14 comprises, in the example, an input pocket 20 for a value-document stack, and a singler 22 for singling value documents out of the value-document stack in the input pocket 20.

The output device 16 comprises, in the example, three output portions 24, 25 and 26 into which processed value documents can be sorted, sorted according to the result of the processing. In the example, each of the portions comprises a stack pocket and a stacking wheel (not shown) by means of which fed value documents can be deposited in the stack pocket.

The transport device 18 has at least two, in the example three, branches 28, 29 and 30 at whose ends one of the output portions 24, 25, 26 is respectively disposed, and, at the branching points, gates 32 and 34 controllable by actuating signals for feeding value documents to the branches 28 to 30 and thus to the output portions 24 to 26 in dependence on actuating signals.

On a transport path 36, defined by the transport device 18, between the feeding device 14, in the example more precisely the singler 22, and the first gate 32 after the singler 22 in the transport direction there is disposed a sensor device 38 which measures physical properties of the value documents when value documents are being transported past, and forms sensor signals representing the measurement results. In this example, the sensor device 38 has three sensors, namely an optical remission sensor 40 which captures a remission color image of the value document, an optical transmission sensor 42 which captures a transmission image of the value document, and a transmission ultrasonic sensor 44 which captures or measures ultrasound transmission properties of the value document in a spatially resolved manner and will hereinafter only be designated as an ultrasonic sensor for simplicity's sake.

A control and evaluation device 46 is connected via signal connections to the sensor device 38 and the transport device 18, in particular the gates 32 and 34. In connection with the sensor device 38, it classifies for a value document in dependence on the sensor signals of the sensor device 38 in one of specified authenticity classes and, by emitting actuating signals, so actuates the transport device 18, here more precisely the gates 32 or 34, that the value document is output, in accordance with its class established upon the classification, to an output portion of the output device 16 that is associated with the class. The association with one of the specified authenticity classes, or the classification, is effected here in dependence on at least one specified authenticity criterion.

The control and evaluation device 46 thus has in particular, besides corresponding data interfaces (not shown in the figures) for the sensor device 38 or its sensors, a processor 48 and a memory 50 connected to the processor 48, which stores at least one computer program with program code upon whose execution the processor 48 controls the apparatus or evaluates the sensor signals, in particular for establishing an authenticity class of a processed value document, and actuates the transport device 18 in accordance with the evaluation.

More precisely, while the value document is being transported past, the sensors capture, in accordance with their function, sensing-region properties of sensing regions on the bank note that are determined by the relative position of the sensors to the bank note, whereby the corresponding sensor signals are formed. Each of the sensors can have a different spatial resolution, i.e. the size and distribution of the captured sensing regions on the bank note can vary in dependence on the respective sensor and the transport speed employed. Each of the sensing regions has associated therewith a location that represents the position of the sensing regions for the respective sensor relative to each other and/or relative to the bank note.

The control and evaluation device 46 establishes from the analog or digital sensor signals of the sensors of the sensor device 38 upon a sensor-signal evaluation at least one sensing-region property and/or at least one value-document property which is relevant for the testing of the bank notes with respect to their authenticity. Preferably, a plurality of these properties are established. In this example, there are established as optical sensing properties a transmission image and a remission image, and as an acoustic property the ultrasound transmission of the sensing regions.

In dependence on the sensing-region properties, the control and evaluation device 46 establishes for the different sensors respective authenticity signals that represent whether or not the established sensing-region or value-document properties represent an indication of the authenticity of the value document. In consequence of these signals, corresponding data can be stored in the control and evaluation device 46 for later employment. In dependence on the authenticity signals, the control and evaluation device 46 then establishes an overall result for the authenticity check according to a specified overall criterion, and forms the control signal for the transport device 18 in dependence on the result.

For processing value documents 12, value documents 12 inserted into the input pocket 20 as a stack or singly are singled by the singler 22 and fed in singled form to the transport device 18, which transports the singled value documents 12 past the sensor device 38. The latter captures the properties of the value documents 12, whereby sensor signals are formed which represent the properties of the respective value document. The control and evaluation device 46 captures the sensor signals, establishes in dependence thereon an authenticity class of the respective value document, and so actuates the gates in dependence on the result that the value documents are transported in accordance with the established authenticity class into an output portion associated with the respective authenticity class.

For establishing an authenticity class on the basis of ultrasonic properties there is used, inter alia, the transmission ultrasonic sensor 44, which, in the example, is constructed as follows (cf. FIGS. 2 and 3).

The ultrasonic sensor 44 has a plurality of ultrasonic transducers 52 disposed both transversely to a transport direction T of the value documents 12 and longitudinally thereto substantially in a plane parallel to a direction along the transport path 36 of the transported value document 12, and actuated by the control and evaluation device 46, for emitting ultrasonic pulses onto the bank note. These ultrasonic transducers 52 thus serve as ultrasonic transmitters.

Disposed opposite the ultrasonic transducers or transmitters 52 relative to the transport path 36 are the same number of ultrasonic transducers 54 serving as ultrasonic receivers, which so disposed to the control and evaluation device 46 via interfaces not shown in the figures and schematically shown signal connections that they can receive ultrasonic waves that emanate from a value document 12 transported along the transport path 36 and are caused by acoustic irradiation with ultrasonic pulses of the ultrasonic transmitters 52.

Each of the ultrasonic transmitters 52 has associated therewith one of the ultrasonic receivers 54 such that there results therebetween an ultrasonic path 56 extending in this example at least approximately orthogonally to a value document 12 transported along the transport path 36, along which ultrasonic path an ultrasonic pulse emitted by the respective ultrasonic transmitter 52 runs to the ultrasonic receiver 54 associated therewith. With each pair of ultrasonic transmitters and ultrasonic receivers associated therewith or with each ultrasonic path 56 in connection with the control and evaluation device 46, it is thus possible to establish a value for the ultrasound transmission of the value document 12 at the location acoustically irradiated with the ultrasound, which value is described by an ultrasound transmission measurement value.

The ultrasonic transducers 52, 54 are so configured that they are well suited for emitting or receiving ultrasonic pulses with a duration in the range of, in the example, about 30 μs and an ultrasonic frequency, i.e. an amplitude maximum of the spectrum of the ultrasonic pulse, of, in the example, about 400 kHz. Further, they are so dimensioned that a respective spot 58, i.e. sensing region, acoustically irradiated upon acoustic irradiation with the ultrasonic pulses on a value document 12 transported along the transport path 36 has a diameter of about 2 mm. Each of the sensing regions has associated therewith, as the location, the center of the sensing region. In FIG. 4 the sensing regions are represented in reduced size for clarity's sake.

The ultrasonic transmitters 52 and ultrasonic receivers 54 are so disposed in planes parallel to the value document 12 in the transport path 36 that values for the ultrasound transmission are capturable for strip- or track-shaped capture regions 60 extending parallel to the transport direction T, as represented in FIG. 4 for an instantaneous view during capture.

Figure 5:
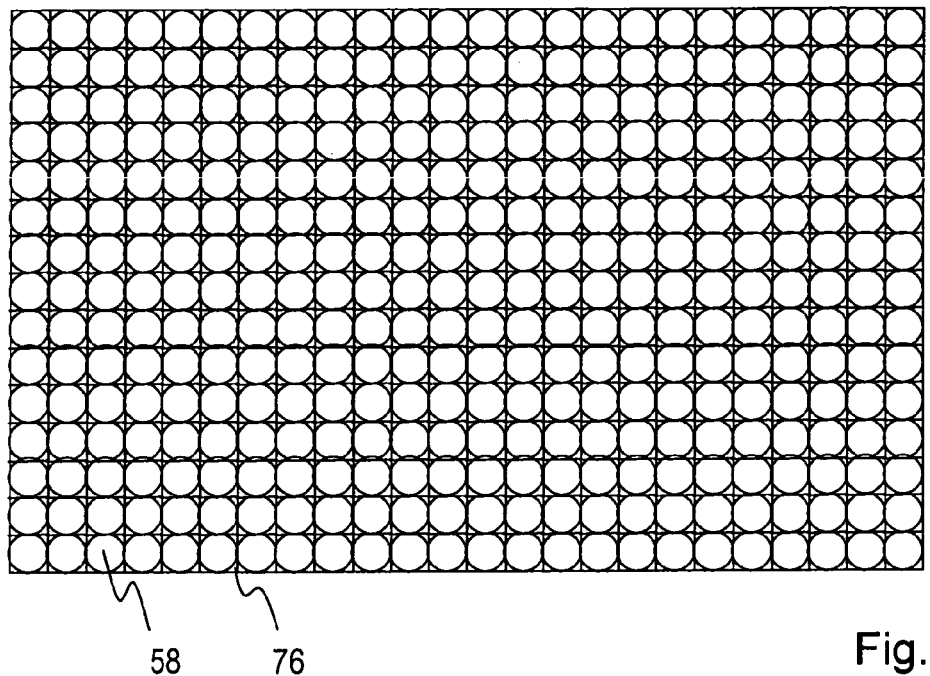

Altogether, there can thus result a distribution, represented schematically in FIG. 5 for a value document 12, of sensing regions 58 or locations for which transmission values are capturable when the value document 12 is transported through the ultrasonic paths 56 at a constant, suitably specified speed and transmission values are captured at specified time intervals during transport. In this exemplary embodiment, the actuation is effected independently of the entry of a value document 12 into the capture region of the transmission ultrasonic sensor 44. To suppress an unwanted reception of ultrasonic pulse echoes, the respective ultrasonic receiver for an ultrasonic path can be switched on at a delay of somewhat less than the pulse transit time for the ultrasonic path, relative to the time when the ultrasonic pulse is emitted by the ultrasonic transmitter for the ultrasonic path, and be switched off again before twice the pulse transit time since emission.

There thus results a regular arrangement of the sensing regions 58 or locations on the value document 12, in the example an arrangement on a rectangular grid. The arrangement of the ultrasonic transmitters 52 and ultrasonic receivers 54 is so chosen that the distance between consecutive locations in at least one of the strips or capture regions 60 is smaller than 1 cm.

The sensor 44 has in the exemplary embodiment in particular twenty-four ultrasonic transmitter/receiver pairs or ultrasonic paths 56, which are so disposed that the capture regions 60 or the tracks have a width of about 2 mm. The ultrasonic spatial resolution hence also lies at 2 mm.

Due to the time required for capturing the ultrasound transmission, and the possibly high transport speed of the value document, the spots may be elongate, i.e. altogether rather elliptical, in the transport direction, unlike the only schematic representation in the figures.

For capturing the transmission values, the control and evaluation device 46 captures at constant time intervals the sensor signals of the ultrasonic receivers 54 which represent the intensity or power of individual receiving ultrasonic pulses as a function of time and thus, due to the constant transport speed, also of location. Using these signals, the control and evaluation device 46 also establishes the entry of a value document into the capture region of the sensor 44. The transmission values are given here simply by the received ultrasonic pulse energies, assuming a basically constant transmit power of the ultrasonic transmitters 52. In other exemplary embodiments, however, it is also possible to divide the received ultrasonic pulse energies by a specified or measured ultrasonic pulse energy of transmitted pulses and thus obtain normalized transmission measurement values.

The established transmission measurement values are stored so as to be associated with the locations for which they were captured. This can be effected for example in such a way that the transmission values are stored in the memory 50 in the time sequence of their capture separately for each of the capture regions 60. The capture region 60 then corresponds to a coordinate in a direction transverse to the transport direction, and the position in the row along the capture region 60 to a coordinate in transport direction T. An index stating the position in the row, together with the rule for translating locations into the row, then represents the location information.

The frequency at which the ultrasonic pulses are successively emitted and transport speed of the bank note are so chosen that at least five transmission values are captured in each capture region 60 along the transport direction of the bank note. In the example, transmission values are captured at an interval of 3 mm, preferably 2 mm, along the transport direction.

Figure 6:
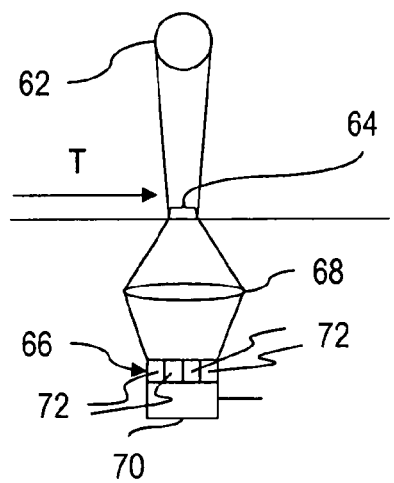

The optical transmission sensor 42 represented more precisely in FIG. 6, but only schematically in a view transverse to a transport plane of the value documents, comprises, inter alia, on one side of the transport path or the transport plane in which the value document is transported through the optical transmission sensor 42, an illumination device 62 for illuminating a capture region 64 with optical radiation in at least one specified wavelength region, in the example with white light and IR radiation. On the other side of the transport path, the transmission sensor 42 possesses a line-scan camera 66 for capturing, in specified wavelength regions, optical radiation coming from the capture region, and an imaging optic 68 for imaging the capture region onto the line-scan camera 66, i.e. for focusing the optical radiation coming from the capture region 64 onto the line-scan camera 66. Further, the transmission sensor 42 has a sensor evaluation device 70 which receives signals of the line-scan camera 66 and carries out a pre-evaluation.

The value documents are transported through the capture region 64 in the transport plane, which in FIG. 6 extends orthogonally to the drawing plane parallel to the transport direction T. The line-scan camera 66 has at least one line of capture elements 72, hereinafter designated sensor elements, in the example four lines of sensor elements. Before each line is disposed a filter by means of which the radiation falling on the line from the capture region 64 is filtered. In the example, filters are provided for red, green and blue light and infrared radiation. Since the lines have the same configuration except for the configuration of the filters (not shown), only one line and the processing of the signals of the sensor elements of the line will hereinafter be described further. Each of the sensor elements is connected to the sensor evaluation device 70 via a signal connection via which the evaluation device 70 captures the signals of the sensor elements, or reads them out.

Figure 7:
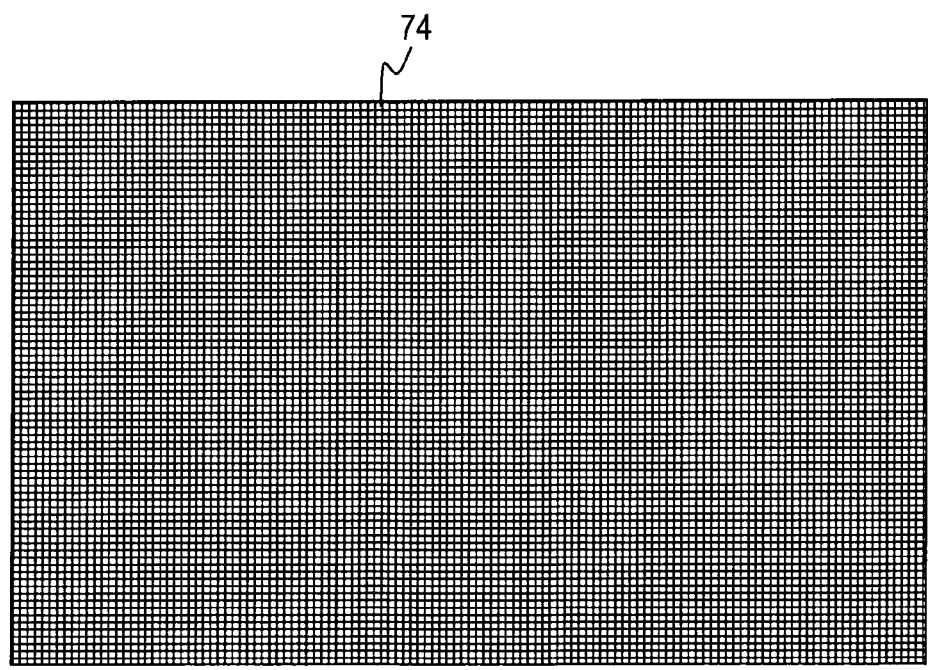

While the value document is being transported past at the specified transport speed, intensities of the optical radiation respectively falling on the sensor elements are captured by means of the sensor elements of a respective line at equal successive time intervals, and corresponding sensor signals formed. There corresponds to each sensor element a pixel of a pixel line of the image of the value document for the respective color or IR. The pixel rows are lined up according to the order of their capture, so that there results an optical image of the value document which is formed by the pixels of the lined-up pixels. The pixel data for a pixel then comprise values that represent the captured intensities in the four wavelength regions, as well as data that represent the location of the pixel in the image or the corresponding location on the value document. The transmission sensor 42 is so adapted that, at the transport speed at which value documents are transported therethrough, the pixels are square or lie on a square grid. The resolution of the optical image is given by the distance between the nearest neighboring pixels. The distance between two pixels is the distance between two specified points which are respectively specified for the pixels in a mutually corresponding manner, for example their lower left corners or, in this exemplary embodiment, the centers to which the location information also corresponds. In the present example, the spatial resolution lies at about 0.2 mm. FIG. 7 shows schematically a value document with the pixels 74 of the transmission image, but with the spatial resolution being represented in reduced form to make the representation clearer.

In the hereinafter described method, reduced-resolution optical images are formed whose spatial resolution corresponds to that of the ultrasound data and which have reduced-resolution pixels which are associated with locations with which ultrasound data are also associated. In the example it is assumed that the centers of the spots 58 are respectively employed as locations for the ultrasound data. Reduced-resolution optical images with the same spatial resolution as the ultrasound data are then formed by reduced-resolution pixels 76 whose area is respectively formed by a region, in the example a rectangle, represented in the figures as a square for simplicity's sake, whose center forms the respective location of the ultrasound data and whose extension is so chosen that it encloses to the respective spot 58 as closely as possible. This is illustrated in FIG. 5. The pixels need not necessarily border directly on each other, but this is preferred.

Figure 8:
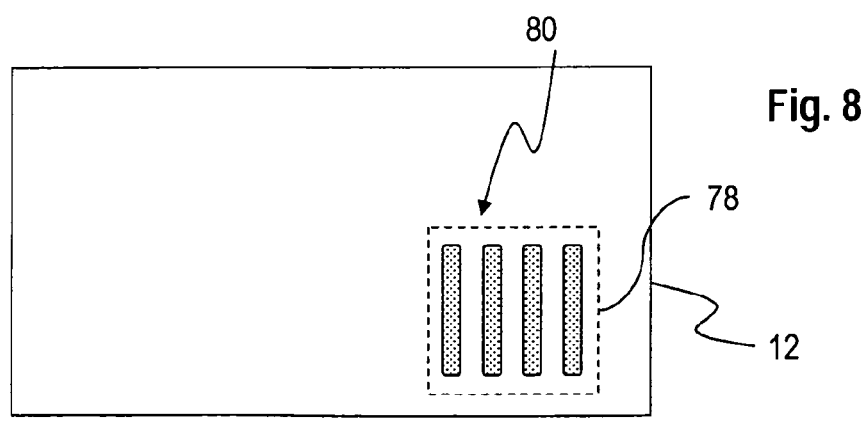

As illustrated schematically in FIG. 8, value documents of the specified type, in this example, possess in a specified security-feature region 78 a bar watermark 80 which is given by a pattern of thickness variations of the value-document substrate and thus of the weight per unit area. The thickness variations lead to a corresponding variation of the optical transmission. For simplicity's sake it is assumed that no printed image is present in the region of the watermark. In FIG. 8 the regions represented by dotted lines are to represent regions of reduced thickness of the value document and of concomitant elevated optical and ultrasound transmission.

Figure 9:
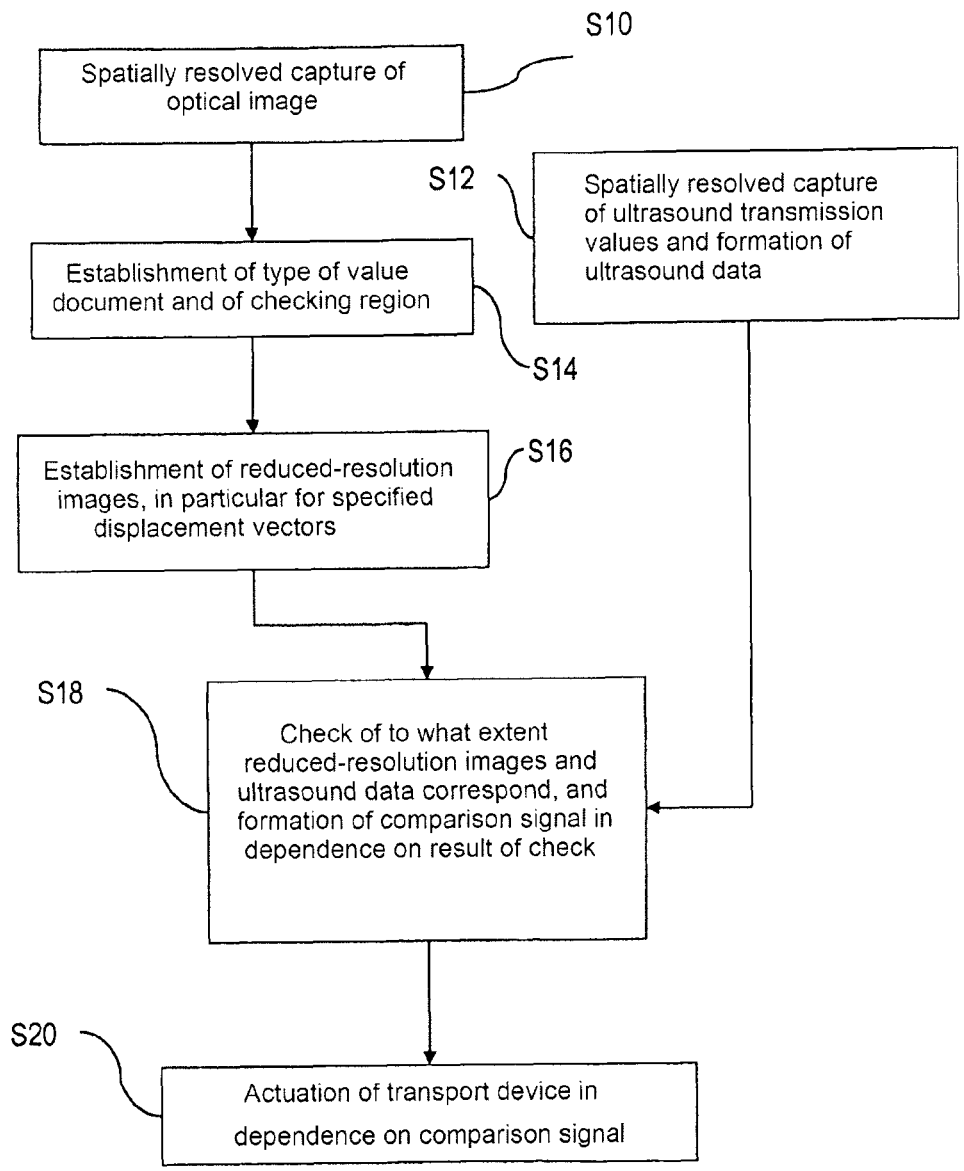

Starting out from the ultrasound data or ultrasound transmission data captured for the value document, i.e. ultrasound transmission values present as a function of the location, and the pixel data of the optical image, the apparatus or the control and evaluation device 46, more precisely the processor 48, now, when executing program code of the computer program stored in the memory 50, performs the following method for checking a value document of a specified type for the presence or lack of a watermark. The first steps S10 and S12, however, are carried out partly by the ultrasonic sensor 44 and the optical transmission sensor 42. The method is illustrated very schematically as a flowchart in FIG. 9. What is shown is a portion of the method that is run through for each checked value document.

In step S10 there is captured by means of the above-described optical transmission sensor 42 a transmission image of the value document with three color channels and one infrared channel which is given by the above-described pixel data for the pixels of the image.

In step S12 the ultrasound transmission is captured by means of the above-described transmission ultrasonic sensor 44 in a spatially resolved manner so as to form location-dependent ultrasonic measuring data. The measuring data represent the intensity of the transmitted ultrasound and thus the ultrasound transmission in dependence on the location. They are stored temporarily in the memory 50 of the control and evaluation device 46.

The steps S10 and S12 can be carried out partly simultaneously or in a suitable manner successively.

In the example, the control and evaluation device 46 and the method performed by means thereof or at least partly thereby are designed for checking value documents of the specified value-document type, given here by the currency and denomination of the value document. Value documents of the specified value-document type are distinguishable from value documents of other types by their printed image (not shown in the figures).

In step S14 the control and evaluation device 46 establishes the type of the value document as well as its position in dependence on measuring data captured by the remission sensor 40 and/or on the image captured by means of the transmission sensor 42. Methods for this purpose are known to the person skilled in the art. In dependence on the value-document type and according to the value document of the established position, the control and evaluation device then establishes the security-feature region 78 associated with the respective value-document type, in which region the locations of the ultrasound data or ultrasound transmission measurement values used for the further check must lie, and thus the corresponding ultrasound data.

In step S16 the control and evaluation device 46 establishes from the captured image reduced-resolution optical images which have a spatial resolution corresponding to that of the ultrasound data.

For this purpose, there is carried out in a first substep, for smoothing the pixel data of the captured image, a low-pass filtering of the pixel data of the captured image, wherein the pixel data for one location in each case through the average of the pixel data over the respective location and the neighboring eight pixels is carried out.

Further, in a second substep, the pixel data are constrained to the effect that only those portions are employed that describe the IR transmission. In other exemplary embodiments, the pixel data could also be changed to the effect that they represent the lightness resulting from the color portions.

In a third substep, the reduced-resolution images themselves are then established.

For this purpose, the pixel data of the captured image and the ultrasound data are first synchronized to the effect that the location information is respectively stated in the same reference system or coordinate system on the value document. More precisely, employing the known distance of the optical transmission sensor and of the ultrasound transmission sensor and the specified transport speed as well as the employed sensing rates of the two sensors, it is established at which location in the captured image of the transmission sensor the locations associated with the ultrasound data lie.

The reduced-resolution pixel data of the reduced-resolution images result from the pixel data of pixel blocks in the captured image, said pixel data having been established in the first substep. A location respectively associated with the ultrasound data lies in the geometrical center of the pixel block. The number of the pixels of the pixel block results from the ratio v of the spatial resolution of the captured image and the ultrasound data as well as the area of the spots or ultrasonic sensing regions 58. This ratio v lies at 10 in the present example, but for clarity's sake a ratio of 5 is employed for illustration in FIG. 10*a* to *c*. For each location with which ultrasound data are associated, an average of the pixel data from the second substep is established from a rectangular pixel block which encloses the respective sensing region as closely as possible and whose geometrical center lies nearest to the location. The size of the sensing region is previously established by experiments or simulations, so that the form and size of the pixel blocks is also fixed in advance.

Figure 10A:
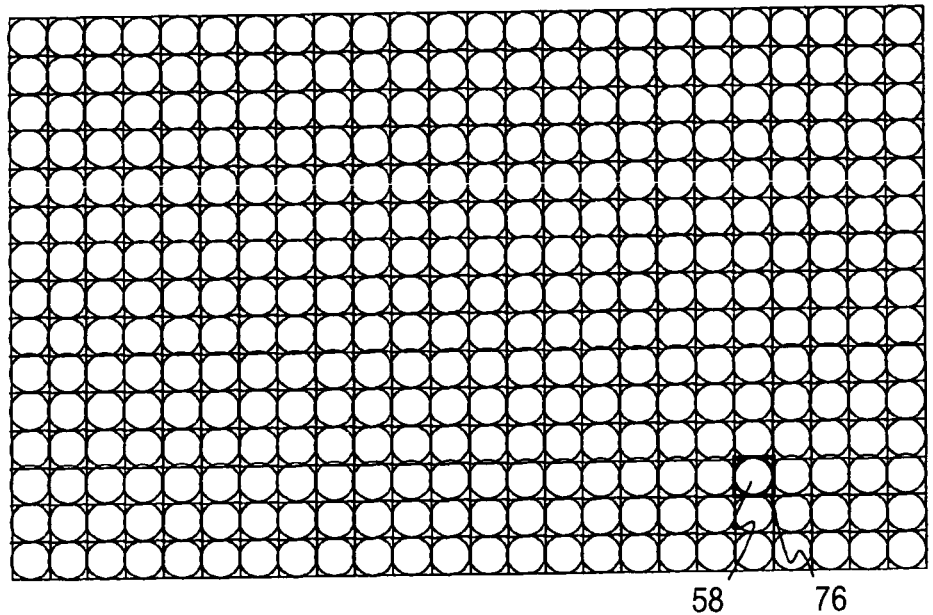
Figure 10A:
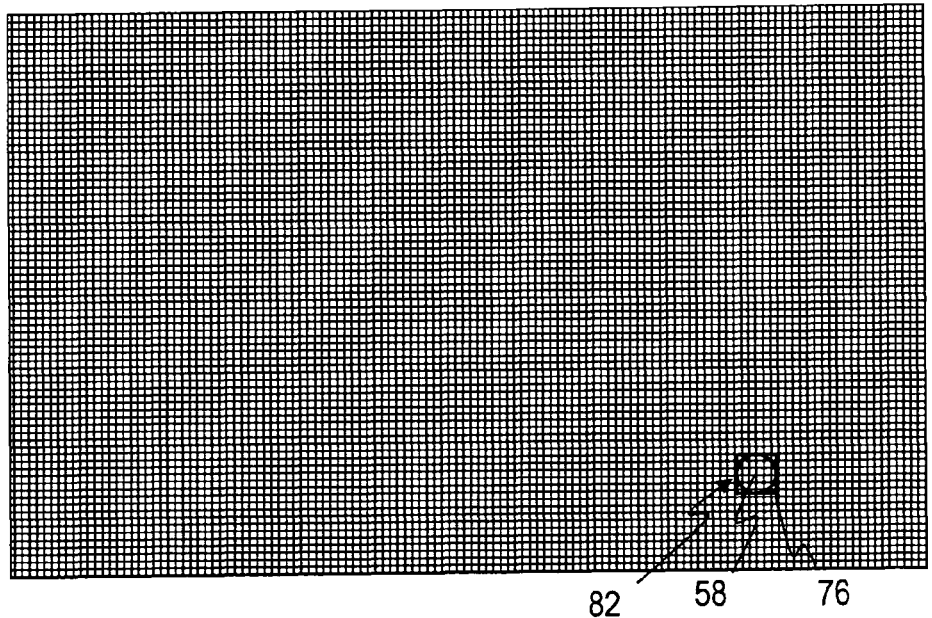
Figure 10B:
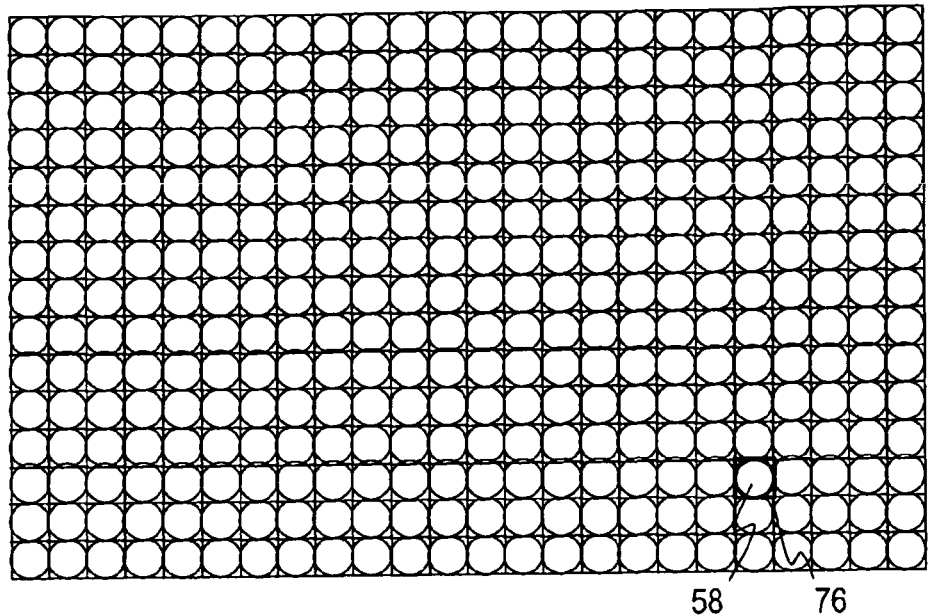
Figure 10B:
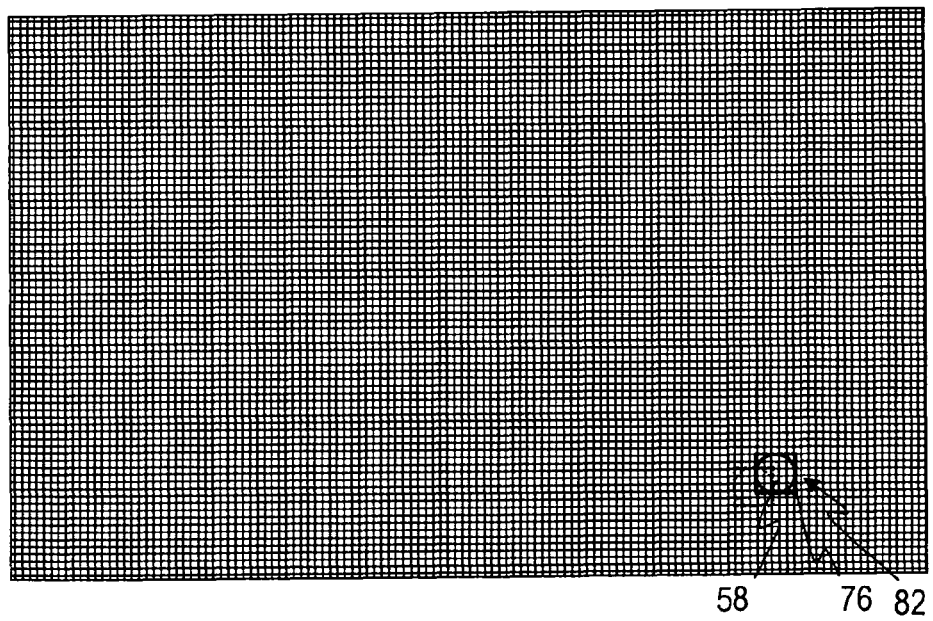
Figure 10C:
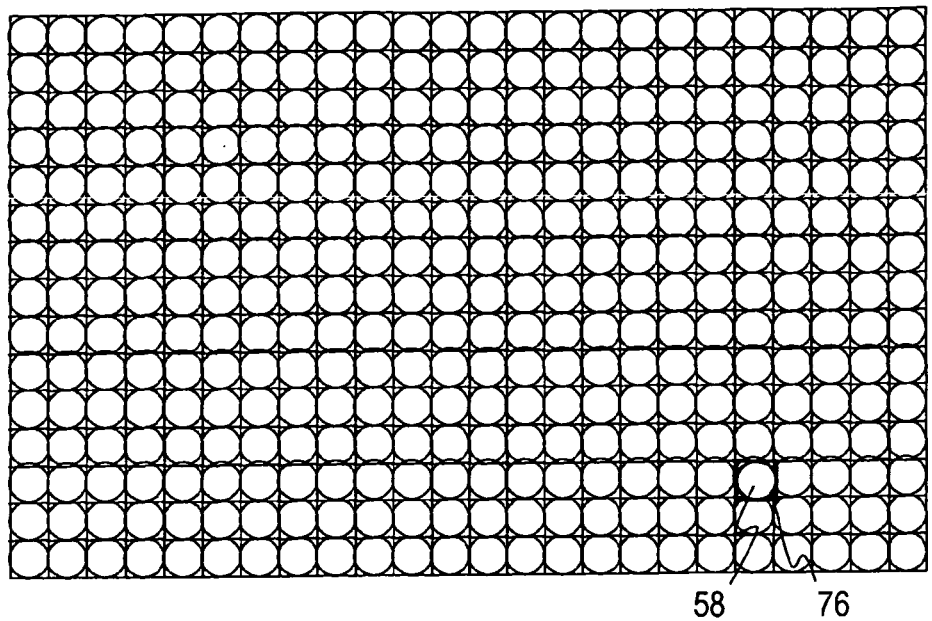
Figure 10C:
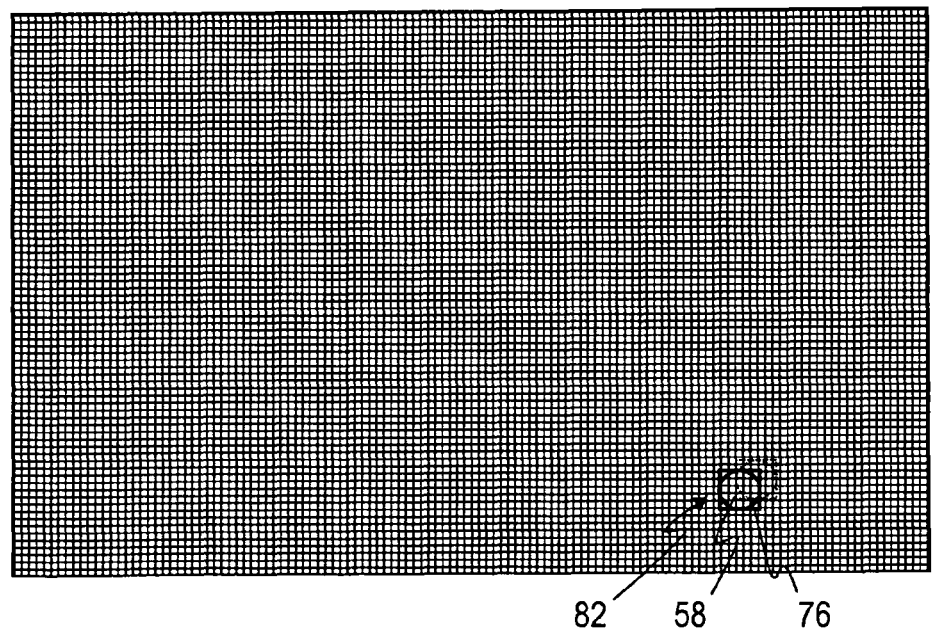

This is done, on the one hand, for the captured image without a further displacement, i.e. for a location with which ultrasound data are associated there is employed a pixel block in whose geometrical center the location lies. On the other hand, reduced-resolution images are established for specified displacement vectors. In these, the geometrical center of the pixel block is displaced by the displacement vector relative to the location with which the ultrasound data are associated. In the present example, the displacement vectors lie on the grid formed by the pixels of the captured image. When the displacement vectors are represented by the components in the directions x and y of the grid, all displacement vectors are formed whose x component lies in units of pixels between the negative of one half of the above-mentioned ratio of the spatial resolutions and one half of the above-mentioned ratio of the spatial resolutions. The same holds for the y components. When a and b thus designate the edge lengths of the rectangular pixels in the captured image, the displacement vectors have the components $(x,y)=(i*a, j*b)$, with $-int(v/2) < i, j < int(v/2)$, where i,j are non-zero integers and $int(z)$ designates for a number z the integer having the smallest distance to z. Illustrations are shown in FIGS. 10*a* to 10*c*, the pixels are square, so that a=b. Each of these figures corresponds to the combination of FIGS. 5 and 7, i.e. the upper part shows the position of the locations of the ultrasound data or the ultrasonic sensing regions and the reduced-resolution pixels of the reduced-resolution image, the lower part the pixels of the captured optical image of the value document. In the upper parts there is respectively drawn in bold a reduced-resolution pixel with a corresponding ultrasonic sensing or measuring region. The lower parts of FIGS. 10*a* to 10*c* show for said region the region or pixel block 82 marked by the pixel drawn in bold, whose pixels or pixel data of the captured image are employed for establishing the reduced-resolution pixel. In FIG. 10*a* there is no displacement between ultrasound data and the captured image, but in FIGS. 10*b* and 10*c* there is. In FIGS. 10*b* and 10*c* the displacement is recognizable by the fact that the pixel block from FIG. 10*a* is represented by dashed lines again.

In step S18 the control and evaluation device 46 then checks to what extent or whether the reduced-resolution images and the ultrasound data correspond to each other for the security-feature region. For this purpose, there is established for each of the reduced-resolution images the normalized cross-correlation of the pixel data of the respective reduced-resolution image and of the ultrasound data, i.e. of the measurement values. When u(X) and t(X) designate the ultrasound transmission and optical transmission at the location X in the security-feature region, as are given by the ultrasound data and the reduced-resolution images, the cross-correlation is understood to be the value $$\frac{\sum_{x} u(X) \cdot t(X)}{\sqrt{\sum_{x} u^2(X)} \sqrt{\sum_{x} t^2(X)}}$$

Thereafter the maximum of the established normalized cross-correlations is sought and compared with a specified threshold value which was established by examining specified authentic reference value documents of the specified value-document type and preferably also forgeries of such value documents.

Then a comparison signal is formed in dependence on the result of the check. If the maximum lies above the threshold value, there is formed a comparison signal representing that there is no suspicion of forgery. Otherwise there is formed a comparison signal representing that an indication of a forgery was found. The employment of the displacement vectors and of the reduced-resolution images associated therewith has the advantage that influences deriving from the transport and an imperfect establishment of the relative position of the optical transmission sensor and of the ultrasound transmission sensor can be drastically reduced and a better comparison achieved.

In step S20 the transport device is then actuated in dependence on the comparison signal. For this purpose, the control device employs the comparison signal and—in this example—corresponding signals of the other sensors which represent whether it was established from the pixel data of the optical sensors that an indication of a forgery was recognized for the checked value document. If one of the signals represents the presence of an indication of a forgery, the control and evaluation device 46 so actuates the transport device 18 by emitting at least one control signal that value documents recognized as non-authentic are conveyed into a specified output pocket for value documents recognized as forgeries, but other value documents are transported into another output pocket.

In other embodiments, the ultrasonic paths can also be inclined relative to the plane of the bank note to be examined, in order to avoid the influence of echoes when employing ultrasonic pulses.

Further, the ultrasound can also be emitted continuously instead of in pulses. In this case the ultrasonic paths are preferably likewise inclined relative to the bank note to be examined, in order to avoid the occurrence of standing waves.

Furthermore, other exemplary embodiments can differ from those described hereinabove in that the ultrasonic transducers are disposed along a line extending transverse to the transport direction.

Other exemplary embodiments differ from the exemplary embodiments described hereinabove in that the reduced-resolution images are only established for the security-feature region. The ultrasound data then also need to be captured only for this region.

In other exemplary embodiments, the actuation of the transport device can also be effected solely in dependence on the comparison signal.

The invention claimed is:

1. A method for checking a specified security feature of a value document which is present in a specified security-feature region of the value document wherein:

there are captured pixel data which describe, spatially resolved with a specified optical spatial resolution, an optical image at least of the security-feature region of the value document;

there are captured ultrasound data which describe an ultrasonic property of the value document at least in the security-feature region, spatially resolved with a specified ultrasonic spatial resolution, the ultrasonic spatial resolution being lower than the optical spatial resolution;

from the pixel data there are established first reduced-resolution pixel data for reduced-resolution pixels of a first reduced-resolution image which describe a reduced-resolution optical image at least of the security-feature region of the value document, whose optical spatial resolution corresponds to the ultrasonic spatial resolution, so that locations respectively associated with the ultrasound data have associated therewith first reduced-resolution pixel data; and it is at least checked to what extent the first reduced-resolution pixel data and the ultrasound data correspond to each other.

2. The method according to claim 1, wherein at least in dependence on the result of the check there is formed a comparison signal representing whether an indication was established that the security feature is present, or an indication was established that the security feature is not present.

3. The method according to claim 1, wherein different displacement vectors are specified for the optical image, and for each of the displacement vectors there are established from the pixel data of the optical image reduced-resolution pixel data for a further reduced-resolution image associated with the displacement vector;

which describe a reduced-resolution optical image of the security-feature region of the value document, whose optical spatial resolution corresponds to the ultrasonic spatial resolution, so that locations respectively associated with the ultrasound data have associated therewith for the security-feature region reduced-resolution pixel data of the further reduced-resolution image associated with the displacement vector;

the pixel data of the optical image that are employed for establishing the further reduced-resolution pixel data for a respective location being pixel data for pixels that are displaced by the specified displacement vector relative to the pixels of the optical image that are employed for establishing the first reduced-resolution pixel data for the respective location; and it is further checked to what extent the further reduced-resolution spatially resolved pixel data for the reduced-resolution images associated with the displacement vectors and the spatially resolved ultrasound data correspond to each other; and the comparison signal is formed additionally in dependence on the further check.

4. The method according to claim 3, wherein the displacement vectors lie on a grid formed by the pixels of the optical image.

5. The method according to claim 1, wherein for checking to what extent the reduced-resolution pixel data and the ultrasound data correspond to each other, there is established a value of a, preferably normalized, cross-correlation between the reduced-resolution pixel data and the ultrasound data; and upon the forming of the comparison signal there is established the greatest value of the cross-correlations, the established greatest value is compared with a specified threshold value, and the comparison signal is formed in dependence on the comparison with the threshold value.

6. The method according to claim 1, wherein for establishing the reduced-resolution pixel data for a reduced-resolution pixel or further reduced-resolution pixel, there are employed pixel data for pixels of the optical image that form a pixel block whose greatest diameter is greater than three times the spatial resolution of the optical image and smaller than 1.2 times the spatial resolution of the ultrasonic sensor.

7. The method according to claim 1, wherein before the establishment of the reduced-resolution pixel data there is performed a smoothing of the pixel data of the optical image, at least in the security-feature region.

8. The method according to claim 1, wherein when establishing the reduced-resolution pixel data there is formed a simple or weighted arithmetic average of pixel data of the optical image.

9. The method according to claim 3, wherein the number of the displacement vectors is greater than one sixteenth of the number of the pixels of the pixel block.

10. The method according to claim 1, wherein the specified pixel data are formed by means of an optical sensor, and the specified ultrasound data are formed by means of an ultrasonic sensor.

11. A non-transitory computer-readable medium having stored thereon a computer program for checking a security feature of a value document which is present in a specified security-feature region of the value document, the computer program comprising instructions that, when executed by a data-processing device causes the method according to claim 1 to be performed.

12. An apparatus for checking a specified security feature of a value document which is present in a specified security-feature region of the value document, wherein said apparatus comprises an evaluation device configured to perform the method according to claim 1.

13. The apparatus according to claim 12, wherein the evaluation device comprises:
a data-processing device; and
a memory which stores a computer program; and
wherein the specified pixel data are formed by means of an optical sensor, and the specified ultrasound data are formed by means of an ultrasonic sensor.

14. The apparatus according to claim 12, further comprising:
an optical sensor configured for producing, for the value document, pixel data which describe an optical image of the value document that is spatially resolved with a specified optical spatial resolution; and
an ultrasonic sensor configured for producing, for the value document, ultrasound data which describe an ultrasonic property of the value document, spatially resolved with a specified ultrasonic spatial resolution, at least in the security-feature region, the ultrasonic spatial resolution being lower than the optical spatial resolution; and
wherein the optical sensor, the ultrasonic sensor and the evaluation device are so configured that the evaluation device employs the pixel data formed for the value document as pixel data, and the ultrasound data formed for the value document as ultrasound data, when performing the method.

15. The apparatus according to claim 12, wherein the evaluation device is further configured to form at least in dependence on the result of the check a comparison signal which represents whether an indication was established that the security feature is present, or an indication was established that the security feature is not present.

16. The apparatus according to claim 15, wherein the evaluation device comprises:
a data-processing device; and
a memory which stores a computer program; and
wherein the specified pixel data are formed by means of an optical sensor, and the specified ultrasound data are formed by means of an ultrasonic sensor.

17. The apparatus according to claim 16, further comprising:
an optical sensor configured for producing, for the value document, pixel data which describe an optical image of the value document that is spatially resolved with a specified optical spatial resolution; and
an ultrasonic sensor configured for producing, for the value document, ultrasound data which describe an ultrasonic property of the value document, spatially resolved with a specified ultrasonic spatial resolution, at least in the security-feature region, the ultrasonic spatial resolution being lower than the optical spatial resolution; and
wherein the optical sensor, the ultrasonic sensor and the evaluation device are so configured that the evaluation device employs the pixel data formed for the value document as pixel data, and the ultrasound data formed for the value document as ultrasound data, when performing the method.

* * * * *